3,723,385
SILOXANE CONTAINING PREPOLYMERS AND POLYAMIDE-IMIDES PREPARED THEREFROM
John T. Hoback and Fred F. Holub, Schenectady, N.Y., assignors to General Electric Company
No Drawing. Filed Oct. 1, 1971, Ser. No. 185,905
Int. Cl. C08f *11/04;* C08g *31/24*
U.S. Cl. 260—46.5 E
9 Claims

ABSTRACT OF THE DISCLOSURE

Siloxane containing diamine prepolymers are prepared from a reaction mixture of a polysiloxane diamine, trimellitic anhydride and an organic diamine. Subsequently, the silicone containing diamine prepolymers are reacted with organic dianhydrides and subjected to a heat treatment to form polyamide-imide products which are useful as protective coatings having heat resistant and corona resistant properties.

---

Recently considerable interest has been shown in polysiloxane amides and polysiloxane amide imides useful for insulation and protective purposes where resistance to heat and corona are important requirements. Holub et al., in U.S. Pat. 3,598,785, discloses the preparation of polysiloxane amides from the reaction of an organic diamine, trimellitic anhydride and a polysiloxane containing terminally silicon bonded

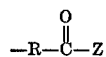

groups, wherein R is a divalent hydrocarbon radical, and Z is a halogen, hydroxyl or methoxy radical. Furthermore, Holub et al. in U.S. Pat. 3,598,784 discloses the preparation of polysiloxane amides and polysiloxane amide imides from the reaction of an organic diamine, a tetracarboxylic dianhydride and a polysiloxane containing terminal silicon-bonded

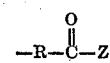

groups, wherein R and Z are defined as hereinabove.

We have now found that a prepolymer can be formed at relatively low temperatures by the reaction of a siloxane containing diamine, trimellitic anhydride and an organic diamine. These prepolymers can then be reacted with dianhydrides to form polymers which are useful for preparing films, coatings and adhesives with corona resistance which cure to novel polyamide-imides. The polymers when coated on fibers such as glass, boron, quartz, and carbon fibers or fabric and various finely divided materials such as metals, carbon, quartz alumina and other ceramics represent coated material structures which have good adhesion to the polymeric matrix.

In accordance with the present invention, the prepolymer is a composition having recurring structural units of the general formula:

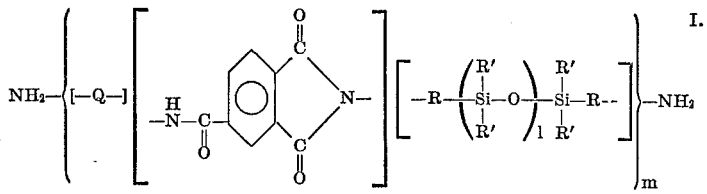

wherein R is a divalent hydrocarbon radical, R' is a monovalent hydrocarbon radical, Q is a divalent organic radical which is the organic residue of the diamine, $l$ is an integer equal to at least 1, for example, from 1 to 50, and $m$ is an integer equal to at least 1, for instance, from 1 to 50. Formula I has been generalized and is intended to include the structure in which the residue of the organic diamine or the residue of the siloxane containing diamine may be attached to the residue of the trimellitic anhydride by either amide or imide linkages. The prepolymer is subsequently reacted with a dianhydride to form a polymeric composition of recurring structural units of the formula:

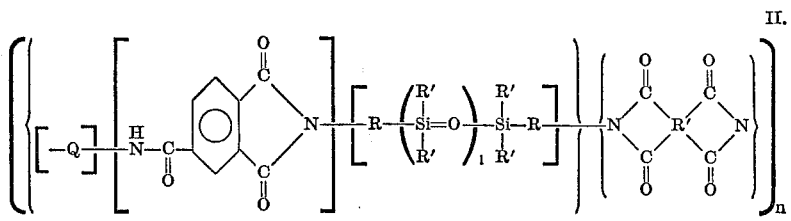

wherein R, R', Q, $l$ and $m$ are defined as hereinabove, R'' is a tetravalent radical which is the residue of the organic dianhydride and $n$ is an integer having a value of about 50 to 100 or more.

The prepolymers of Formula I above can be prepared by effecting a reaction of a mixture of ingredients comprising a diamino siloxane of the general formula:

III.    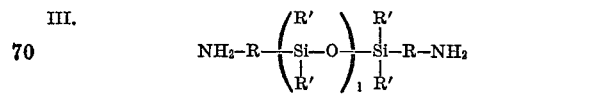

a diamino compound of the formula:

IV.        $NH_2$—Q—$NH_2$ and trimellitic anhydride having the formula:

V.

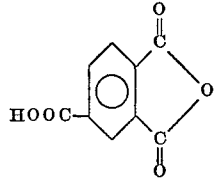

wherein R, R', Q and $l$ have the meanings given above.

Among the diamino siloxanes of Formula III which may be used in the practice of the present invention includes compounds having the following formulas:

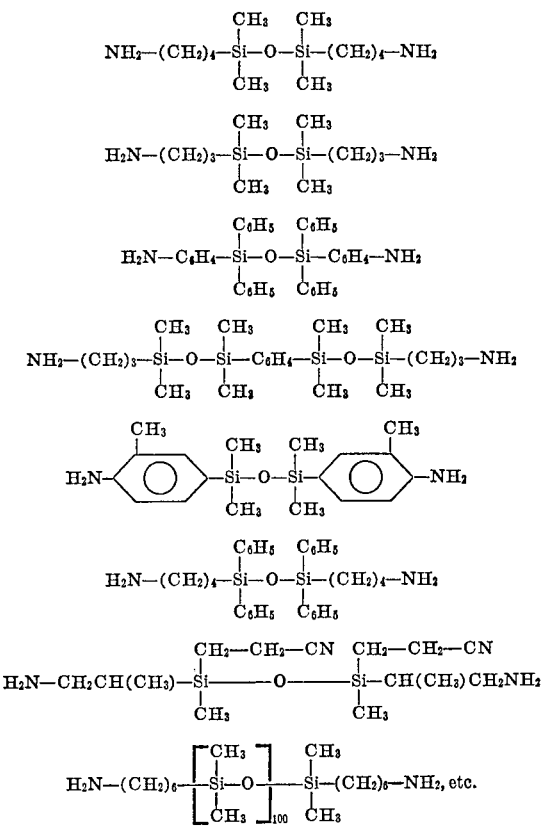

The diamines of Formula IV above are described in the prior art and are to a large extent commercially available materials. Typical of such diamines from which the prepolymer may be prepared are the following:
m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
bis(p-β-methyl-o-aminophenyl)benzene;
1,3-diamino-4-isopropylbenzene;
1,2-bis(3-aminopropoxy)ethane;
m-xylylenediamine;
p-xylylenediamine;
bis(4-aminocyclohexyl)methane;
decamethylenediamine;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;

and mixtures thereof. It should be noted that these diamines are given merely for the purpose of illustration and are not considered to be all inclusive. Other diamines not mentioned will readily be apparent to those skilled in the art.

Subsequently, the prepolymer is reacted with a tetracarboxylic acid dianhydrides characterized by the following formula:

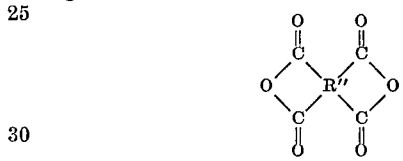

wherein R'' is a tetravalent radical, e.g., a radical derived from or containing an aromatic group containing at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical or to carbon atoms in the R radical at most one carbon atom removed, to provide a 5-membered or 6-membered ring as follows:

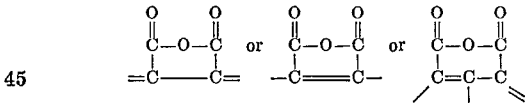

Illustrations of dianhydrides suitable for use in the present invention (with their future designation in parentheses) include:

pyromellitic dianhydride (PMDA);
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
bis(3,4-dicarboxyphenyl)sulfone dianhydride;
benzophenone tetracarboxylic acid dianhydride (BPDA);
perylene-1,2,7,8-tetracarboxylic acid dianhydride;
bis(3,4-dicarboxyphenyl)ether dianhydride; and
bis(3,4-dicarboxyphenyl)methane dianhydride, and aliphatic anhydrides such as cyclopentane tetracarboxylic dianhydride, cyclohexane tetracarboxylic dianhydride, butane tetracarboxylic dianhydride, etc.

In order that those skilled in the art may better understand how the present invention may be practiced, the following examples are given by way of illustration and not by way of limitation. All cut through tests were conducted in the manner described in U.S. 2,936,296. The corona tests (calculated on an equivalent thickness basis) were made according to ASTM D–2275–64T which specified the electrodes. The test chamber used was at 25° C. and contained $CaCl_2 \cdot 2H_2O$ to maintain the relative humidity between 17–20%. A voltage of 1200 volts was applied at 3160 Hz. (cycles/sec.)

EXAMPLE I

To a reaction flask flushed with nitrogen were charged 20.0 g. (0.1 m.) p,p'-methylene dianiline, 19.2 g. (0.1 M) trimellitic anhydride, 27.6 g. (0.1 M) 1,3-bis(δ-aminobutyl)tetramethyl disiloxane and 20.6 g. of N-methylpyrrolidone. The mixture was heated with stirring to 185–195° C. for 8 hours during which 3.6 g. of water (theoretical amount) was collected. The resulting composition may be represented as being composed of a siloxane diamine and an organic diamine of recurring structural unit of the formula:

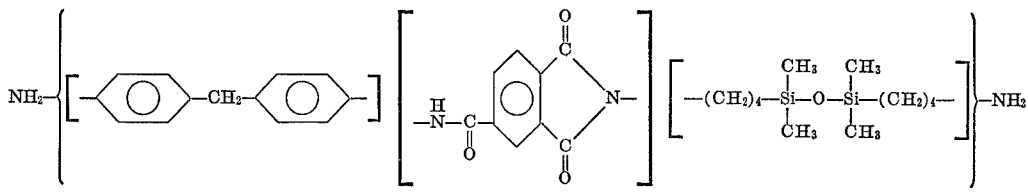

The solution was cooled at room temperature and 160 g. of N-methylpyrrolidone was added and 32.2 g. of benzophenone tetracarboxylic dianhydride was added slowly with vigorous stirring. The polyamide-imide amic acid resin (30% solids in N-methyl-pyrrolidone) was cast as a film on glass and aluminum substrates. The films were cured at 120° C. for 15 minutes, 150° C. for 15 minutes, and 302° C. for 15 minutes. Typically the curing step involves gradually heating the film at a temperature of 100–300° C. to remove solvent and to convert the amic acid to the imide. The finally heat-treated film described above was a polyamide-imide composed of recurring structural units which may be represented by the formula:

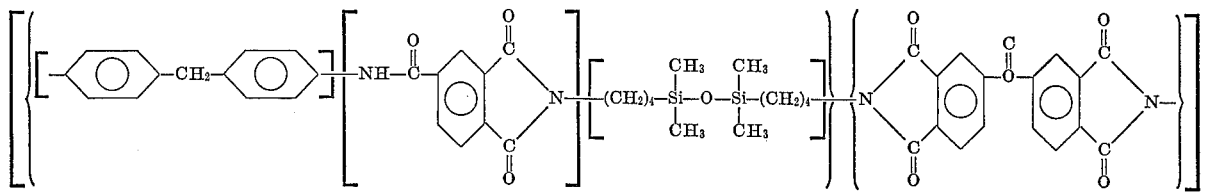

These films were clear, flexible and had good adhesion to both glass and aluminum.

EXAMPLE II

Using the procedure as set forth in Example I, 31.6 g. (0.10 m.) p,p'-methylene dianiline, 19.2 g. (.1 M) trimellitic anhydride, 11.1 g. (0.1 M) 1,3-bis(δ-aminobutyl)-tetramethyl disiloxane and 20.6 g. N-methylpyrrolidone were mixed and reacted. After collecting the theoretical amount of water 3.6 g., the reaction was cooled to room temperature where 123.4 g. of N-methylpyrrolidone was added. The amideimide siloxane diamine upon analysis was found to contain; C, 73.4%; H, 5.5%; N, 10.2%; Si, 2.3%. Calculated for $C_{34}H_{29.2}N_4O_{3.2}Si_{0.4}$: C, 73.4%; H, 5.25%; N, 10.8; Si, 2.01%.

With vigorous stirring 32.2 g. of benzophenone tetracarboxylic dianhydride was added slowly to obtain a 30% solids resin solution. Films were cast on glass and aluminum and then cured at 120° C.—15 minutes, 200° C.—15 minutes, and 302° C.—15 minutes. These films were hard, flexible and had good adhesion to glass and aluminum.

EXAMPLES III–X

In these examples polyamide-imide products were prepared, cast and cured into films, in the same manner as described in the preceding examples employing trimellitic anhydride, various organic diamines and various tetracarboxylic acid dianhydrides for making the polymeric composition. The following table shows the molar concentrations of the ingredients used to make these polyamide-imide products together with the properties of the cured films deposited on an aluminum substrate.

TABLE

| Example | III | IV | V | VI | VII | VIII[1] | IX[1] | X |
|---|---|---|---|---|---|---|---|---|
| Siloxane containing diamine prepolymer: | | | | | | | | |
| MDA | 0.09 | | | 0.8 | 0.4 | 0.8 | 0.5 | |
| MPDA | | 0.8 | 0.5 | | 0.4 | | | 0.8 |
| SDA | 0.1 | 0.2 | 0.5 | 0.2 | 0.2 | 0.2 | 0.5 | 0.2 |
| TMA | 0.5 | 0.5 | 0.5 | 0.5 | 0.5 | 0.5 | 0.5 | 0.5 |
| Anhydrides:[2] | | | | | | | | |
| BPDA | 0.5 | 0.5 | 0.5 | | 0.5 | 0.4 | 0.4 | 0.4 |
| PMDA | | | | 0.5 | | | | |
| MA | | | | | | 0.2 | 0.2 | 0.2 |
| Properties of cured films: | | | | | | | | |
| Cut thru (° C.) | 400 | 400 | 345 | 400 | 400 | 390 | 275 | 400 |
| Corona (hrs.) | | 200 | 1,200 | | | 256 | | |
| Flexibility[3] | Pass | Pass | Pass | Pass | Pass | Pass | Pass | Pass |
| Adhesion[4] | ([5]) | ([5]) | ([5]) | ([5]) | ([5]) | ([5]) | ([5]) | ([5]) |

[1] These examples contain a minor portion of maleic anhydride while all the other samples contain a dianhydride; however, this is considered equivalent since two parts of maleic anhydride are substituted for each part of the dianhydride which are reacted with the diamines to produce polymers.

[2] The abbreviations in table signify the following: MDA=Methylene dianiline; MPDA=m-Phenylene dianiline; SDA=1,3-bis(δ-aminobutyl) tetramethyl disiloxane; TMA=Trimellitic anhydride; BPDA=Benzophenone dianhydride; PMDA=Pyromellitic dianhydride; MA=Maleic anhydride.

[3] The flexibility test was performed by casting film on aluminum sheet, removing film by dissolving aluminumsheet with acid, running finger nail crease on dried film; passing films did not crack.

[4] The adhesion test was determined by casting a film on ordinary soda lime glass, attempting to remove film from plate; good adhesion was indicated by fact that film could not be removed easily.

[5] Good.

It will be appreciated that the invention is not limited to the specific details shown in the examples and illustrations and that various modifications may be made within the ordinary skill in the art without departing from the spirit and scope of the invention.

We claim:
1. A composition having recurrent structural units for the general formula:

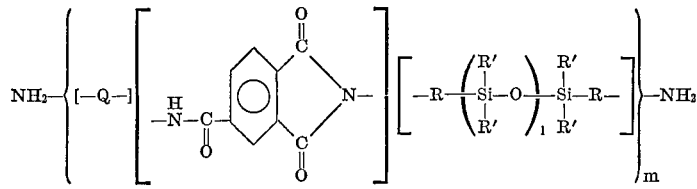

wherein R is a divalent hydrocarbon radical, R' is a monovalent hydrocarbon radical, Q is a divalent organic radical selected from the group consisting of alkylene containing from 2–20 carbon atoms, cycloalkylene, alkylcycloalkylene, xylylene, phenylene, lower alkylphenylene,

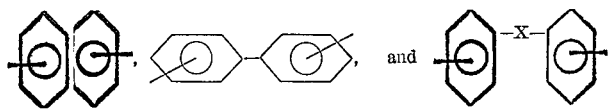

selected from the group having 1–8 carbon atoms consisting of bivalent aliphatic, cycloaliphatic or araliphatic, —O—,

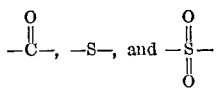

l is an integer equal to at least 1, and m is an integer equal to at least 1.

2. The composition of claim 1, wherein R is lower alkyl, R' is lower alkyl, and Q is said divalent organic radical which is the residue of a diamine.

3. The composition of claim 2, having the recurring structural formula:

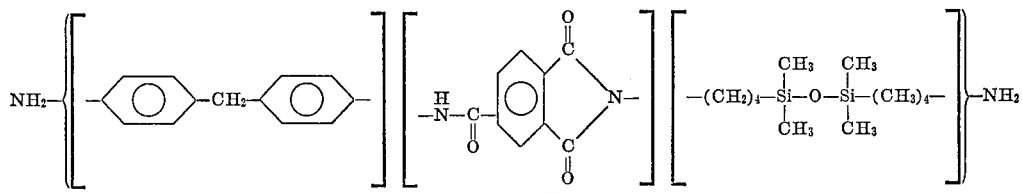

4. The composition of claim 2, having the recurring structural formula:

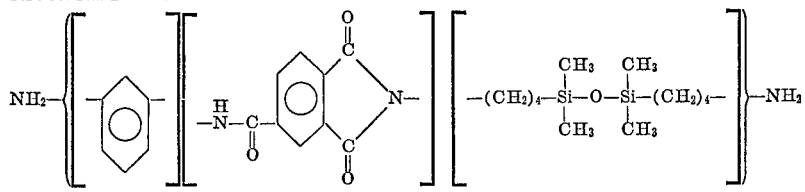

5. A polymeric composition composed of recurring structural units of the general formula:

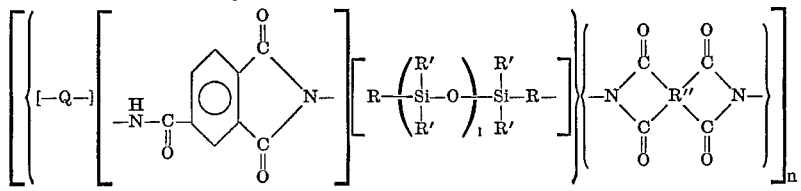

wherein R is a divalent hydrocarbon radical, R' is a monovalent hydrocarbon radical, Q is a divalent hydrocarbon radical selected from the group consisting of alkylene containing from 2–20 carbon atoms, cycloalkylene, alkylcycloalkylene, xylylene, phenylene, lower alkylphenylene,

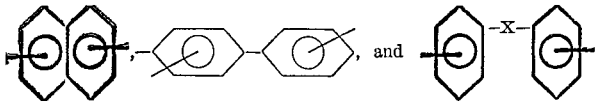

wherein X is a member selected from the group having 1–8 carbon atoms consisting of bivalent aliphatic, cycloaliphatic or araliphatic, —O—, $$-\overset{\text{O}}{\underset{\|}{\text{C}}}-,\ -\text{S}-,\ \text{and}\ -\overset{\text{O}}{\underset{\underset{\text{O}}{\|}}{\overset{\|}{\text{S}}}}-$$

R'' is a tetravalent radical containing an aromatic group containing at least 6 carbon atoms characterized by benzenoid unsaturation, wherein each of the four carbonyl groups of the dianhydride are attached to separate carbon atoms in the tetravalent radical, the carbonyl groups being in pairs in which the groups in each pair are attached to adjacent carbon atoms of the tetravalent radical, l is an integer having a value of at least 1, and n is an integer having a value of at least 50.

6. The polymeric composition of claim 5, wherein R is lower alkyl, R' is lower alkyl, and Q is said divalent organic radical which is the residue of a diamine.

7. The polymeric composition of claim 6, wherein Q is a member selected from

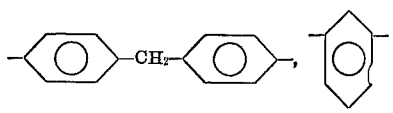

and mixtures thereof, R is butyl, R' is methyl, and R" is a member selected from the group consisting of

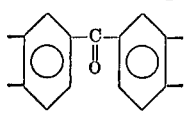

and

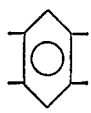

8. The polymeric composition of claim 6, wherein said polymer is terminated by an aliphatically unsaturated monoanhydride.

9. The polymeric composition of claim 6, wherein said monoanhydride is maleic anhydride.

References Cited

UNITED STATES PATENTS

| | | | |
|---|---|---|---|
| 3,392,144 | 7/1968 | Holub | 260—46.5 |
| 3,598,784 | 8/1971 | Holub et al. | 260—46.5 |
| 3,598,785 | 8/1971 | Holub et al. | 260—46.5 |

DONALD E. CZAJA, Primary Examiner

M. I. MARQUIS, Assistant Examiner

U.S. Cl. X.R.

117—124 F, 125, 126 S, 135.1, 139.5 A, 160 R, 160 A, DIG. 11; 260—30.2, 46.5 G, 47 CP, 78 TF, 824 R